US 8,985,262 B2

(12) United States Patent
Sekiya et al.

(10) Patent No.: US 8,985,262 B2
(45) Date of Patent: Mar. 24, 2015

(54) CONSTRUCTION VEHICLE EQUIPPED WITH EXHAUST AFTERTREATMENT DEVICE

(71) Applicant: Komatsu Ltd., Minato-ku, Tokyo (JP)

(72) Inventors: Shigeo Sekiya, Oyama (JP); Ryousuke Maeda, Mito (JP); Muneo Harada, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 14/114,860

(22) PCT Filed: May 10, 2013

(86) PCT No.: PCT/JP2013/063205
§ 371 (c)(1),
(2) Date: Oct. 30, 2013

(87) PCT Pub. No.: WO2014/069026
PCT Pub. Date: May 8, 2014

(65) Prior Publication Data
US 2014/0124284 A1  May 8, 2014

(30) Foreign Application Priority Data
Oct. 30, 2012  (JP) .................................. 2012-239444

(51) Int. Cl.
*B60K 13/04* (2006.01)
*F01N 3/20* (2006.01)
(Continued)

(52) U.S. Cl.
CPC .............. *B60K 13/04* (2013.01); *F01N 3/2066* (2013.01); *F01N 3/035* (2013.01); *F01N 13/009* (2013.01);
(Continued)

(58) Field of Classification Search
CPC ...... B60K 13/04; B60K 13/00; F02D 41/029; F01N 13/08; F01N 13/1822; F01N 13/1805; F01N 3/035; F01N 3/2066; F01N 3/206; F01N 3/00
USPC ............ 180/309, 89.2, 311; 296/198; 60/295, 60/297
See application file for complete search history.

(56) References Cited
U.S. PATENT DOCUMENTS 5,813,224 A * 9/1998 Rao et al. ...................... 60/274
6,223,526 B1 * 5/2001 Wissler et al. ................. 60/286
(Continued)

FOREIGN PATENT DOCUMENTS

JP    2000512245 A   9/2000
JP    2006123717 A   5/2006
(Continued)

OTHER PUBLICATIONS

International Search Report mailed Jun. 4, 2013 from Corresponding International Application No. PCT/JP2013/063205, 3 pages.

Primary Examiner — J. Allen Shriver, II
Assistant Examiner — James M Dolak
(74) Attorney, Agent, or Firm — Fish & Richardson P.C.

(57) ABSTRACT

A construction vehicle adapted to travel using a wheel and equipped with an exhaust aftertreatment device to which a reductant is supplied is provided. At least a portion of the exhaust aftertreatment device including a front end thereof is located on a fender provided for the wheel. A supply pump adapted to supply the reductant and a reductant tank adapted to store the reductant are located ahead of the fender and below the exhaust aftertreatment device. The reductant tank is located below the supply pump.

14 Claims, 6 Drawing Sheets

(51) Int. Cl.
*F01N 3/035* (2006.01)
*F01N 13/00* (2010.01)

(52) U.S. Cl.
CPC ......... *B60Y 2200/41* (2013.01); *F01N 2260/08* (2013.01); *F01N 2340/04* (2013.01); *F01N 2590/08* (2013.01); *F01N 2610/1406* (2013.01)
USPC ........................................ 180/309; 180/89.2

(56) References Cited

U.S. PATENT DOCUMENTS

| | | | |
|---|---|---|---|
| 7,762,060 B2 * | 7/2010 | Easley et al. .................... | 60/285 |
| 8,015,802 B2 * | 9/2011 | Nishiyama et al. ............. | 60/286 |
| 8,056,671 B2 * | 11/2011 | Ikegami et al. ............... | 180/309 |
| 8,365,518 B2 * | 2/2013 | Ezawa et al. .................... | 60/297 |
| 8,403,099 B2 * | 3/2013 | Yokota .......................... | 180/309 |
| 8,407,991 B2 * | 4/2013 | Yokota ............................ | 60/297 |
| 8,549,847 B2 * | 10/2013 | Kamiya et al. .................. | 60/299 |
| 8,555,625 B2 * | 10/2013 | Trinkner et al. ................ | 60/311 |
| 8,556,014 B2 * | 10/2013 | Smith et al. ................. | 180/68.1 |
| 8,573,646 B2 * | 11/2013 | Kamiya ......................... | 280/759 |
| 8,695,748 B2 * | 4/2014 | Togo et al. .................... | 180/309 |
| 2012/0067660 A1 | 3/2012 | Kashu et al. | |
| 2013/0000281 A1 | 1/2013 | Merchant et al. | |

FOREIGN PATENT DOCUMENTS

| | | |
|---|---|---|
| JP | 2008240678 A | 10/2008 |
| JP | 2009275642 A | 11/2009 |
| JP | 2010096014 A | 4/2010 |
| JP | 2011047390 A | 3/2011 |
| JP | 2011131730 A | 7/2011 |
| JP | 2012062693 A5 | 3/2012 |
| WO | 99/02825 A1 | 1/1999 |
| WO | 2011/078238 A1 | 6/2011 |

* cited by examiner

CONSTRUCTION VEHICLE EQUIPPED WITH EXHAUST AFTERTREATMENT DEVICE

CROSS-REFERENCE TO RELATED APPLICATIONS

This application claims priority to International Application No. PCT/JP2013/063205filed on May 10, 2013, which applications claims priority to Japanese Application No. 2012-209444, filed on Oct. 30, 2012. The contents of the above applications are incorporated herein by reference in their entireties.

TECHNICAL FIELD

The present invention relates to a construction vehicle equipped with an exhaust aftertreatment device. In particular, the present invention relates to a tank for storing a reductant which is supplied to an exhaust aftertreatment device equipped in a tired (wheeled) construction vehicle such as a dump truck and to an arrangement of a supply pump for supplying the reductant.

BACKGROUND ART

To capture particulate matter (PM) in an exhaust gas from an internal-combustion engine such as a diesel engine, a dedicated filter (i.e., DPF: Diesel Particulate Filter) is typically used. In order to comply with exhaust gas regulations, an exhaust aftertreatment device with a DPF is equipped in, for instance, an on-road transport truck using a diesel engine. The exhaust aftertreatment device is usually uncovered and located in an exhaust pipe extending from the engine at a position where the device is likely to be exposed to wind during the traveling of the vehicle (e.g., the lower side of the vehicle).

When an exhaust aftertreatment device is located on the lower side of a tired construction vehicle, the exhaust aftertreatment device may be hit by gravel stones thrown up during the traveling of the vehicle or be sunk into mud along with the vehicle, resulting in damage to the exhaust aftertreatment device. In view of the above, it has been suggested that when an exhaust aftertreatment device is equipped in a dump truck, the exhaust aftertreatment device be located alongside a cab, in which an operator rides, and at such a high position as the top of a fender for the right front wheel (see, for instance, Patent Literature 1, FIG. 1).

Recently, stricter regulations on exhaust gas emission require further purification of an exhaust gas. Accordingly, it is preferred that an exhaust aftertreatment device be equipped with a reduction catalyst used to purify a nitrogen oxide in an exhaust gas in addition to the DPF. The reduction catalyst is used in, for instance, SCR (Selective Catalytic Reduction). For SCR, a reductant such as a urea aqueous solution is necessarily supplied into the exhaust gas. Accordingly, the construction vehicle is equipped with a reductant tank for storing the reductant, a supply pump for supplying the reductant, and an injector adapted to inject the reductant.

Patent Literatures 2 and 3 each disclose an SCR-equipped exhaust aftertreatment device for an automobile or a bulldozer (not for a tired construction vehicle) and installation of a reductant tank and a supply pump.

Specifically, Patent Literature 2 discloses that a fuel tank and a reductant tank are unified. Patent Literature 3 discloses that a reductant supply pump is located in a dent formed on an outer surface of a reductant tank.

Additionally, according to some references (specific titles thereof are omitted), it is known that an upper rotary body of a crawler hydraulic excavator may be equipped with a reductant tank, the reductant tank being located in a housing space, which is covered with an exterior cover, being opposite to a cab (in which an operator rides) across a boom (i.e., a working equipment).

CITATION LIST

Patent Literature(S)

Patent Literature 1: JP-A-2010-96014
Patent Literature 2: JP-A-2000-512245
Patent Literature 3: US 2013/0000281 A1

SUMMARY OF THE INVENTION

Problem(s) to be Solved by the Invention

An optimal arrangement of a reductant tank and a reductant supply pump has not been suggested for a tired construction vehicle equipped with an SCR (e.g., a dump truck). In other words, such a construction vehicle requires facilitation of supply of the reductant, reduction in thermal effect from an exhaust gas passage on the reductant, and suppression of power consumption of a defrosting heater provided to a reductant supply tube or the like, so that the optimal arrangement that meets these needs has been demanded.

An object of the invention is to provide a construction vehicle in which a reductant tank and a reductant supply pump are optimally arranged.

Means for Solving the Problem(s)

According to an aspect of the invention, a construction vehicle includes: a wheel; an exhaust aftertreatment device to which a reductant is supplied; a fender on which at least a portion of the exhaust aftertreatment device including a front end thereof is located, the fender being located above the wheel; a supply pump being adapted to supply the reductant and being located ahead of the fender and below the exhaust aftertreatment device; and a reductant tank being adapted to store the reductant and being located ahead of the fender and below the exhaust aftertreatment device and the supply pump.

In the above aspect, the supply pump and the reductant tank are located ahead of the exhaust aftertreatment device located on the fender and the reductant tank is located below the supply pump. With this arrangement, even when wind hits the exhaust aftertreatment device to be heated during traveling, it is possible to prevent the heated wind from being supplied to the reductant tank and the supply pump. Thus, a urea aqueous solution and the supply pump are protected from the thermal influence of the exhaust aftertreatment device, thereby preventing reformation of the urea aqueous solution.

Further, the supply pump and the reductant tank are located adjacent to the front end of the exhaust aftertreatment device, so that the supply pump is not significantly distanced from a reductant injector attached on the exhaust aftertreatment device. Thus, since a tube for the reductant that connects the supply pump and the injector can be shortened, a defrost heater, which is possibly arranged alongside the tube, can also be shortened, thereby reducing the power consumption of the defrost heater.

In addition, since the supply pump and the reductant tank are located below the exhaust aftertreatment device located on the fender, a repairer can perform maintenance such as supply of the reductant while standing on the ground.

In the above aspect, it is preferable that the construction vehicle further includes: an aftercooler being located ahead of the exhaust aftertreatment device; an aftercooler cooling fan being located ahead of the exhaust aftertreatment device; and a shield being adapted to protect the supply pump from a cooling air from the aftercooler cooling fan.

In the above aspect, it is preferable that the construction vehicle further includes a cab in which an operator rides, the cab being located alongside the fender, in which the exhaust aftertreatment device includes: a diesel particulate filter device being adapted to capture a particulate matter in an exhaust gas from a diesel engine; and a selective catalytic reduction device to which the reductant is supplied, the diesel particulate filter device is located on the fender, and the selective catalytic reduction device is located downstream of the diesel particulate filter device in a flow direction of the exhaust gas and behind the cab.

In the above aspect, it is preferable that the construction vehicle further includes a fuel tank being adjacently located ahead of the reductant tank, in which the reductant tank is made of resin, and the fuel tank is made of metal and is in a form of a tank unit integrally including a housing in which the reductant tank is housed.

According to another aspect of the invention, a construction vehicle includes: a wheel; an exhaust aftertreatment device to which a reductant is supplied; an aftercooler being located ahead of the exhaust aftertreatment device; an aftercooler cooling fan being located ahead of the exhaust aftertreatment device; a fender on which at least a portion of the exhaust aftertreatment device including a front end thereof is located, the fender being located above the wheel; a supply pump being adapted to supply the reductant and being located ahead of the fender and below the exhaust aftertreatment device; a reductant tank being adapted to store the reductant and being located ahead of the fender and below the exhaust aftertreatment device and the supply pump; and a fuel tank being adjacently located ahead of the reductant tank, in which the reductant tank is made of resin, the fuel tank is made of metal and is in a form of a tank unit integrally including a housing in which the reductant tank is housed, and the supply pump is located in a shielding box adapted to cover an upper side of the housing to block a cooling air from the aftercooler cooling fan.

BRIEF DESCRIPTION OF DRAWING(S)

DESCRIPTION OF EXEMPLARY EMBODIMENT(S)

Exemplary embodiment(s) of the invention will be described below with reference to the attached drawings.

Figure 1:
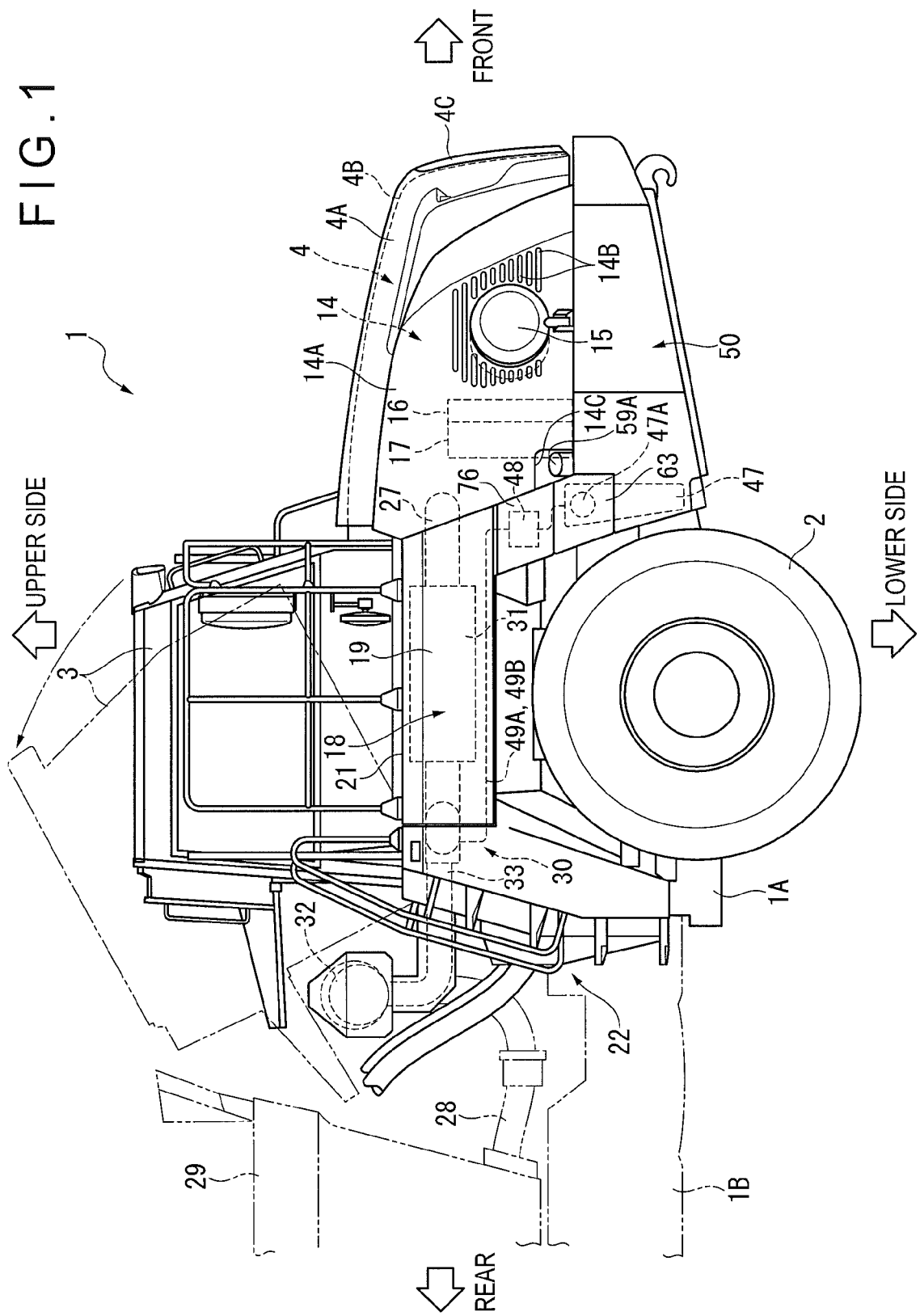
FIG. 1 is a side view showing a relevant part of a construction vehicle according to an exemplary embodiment of the invention.
Figure 2:
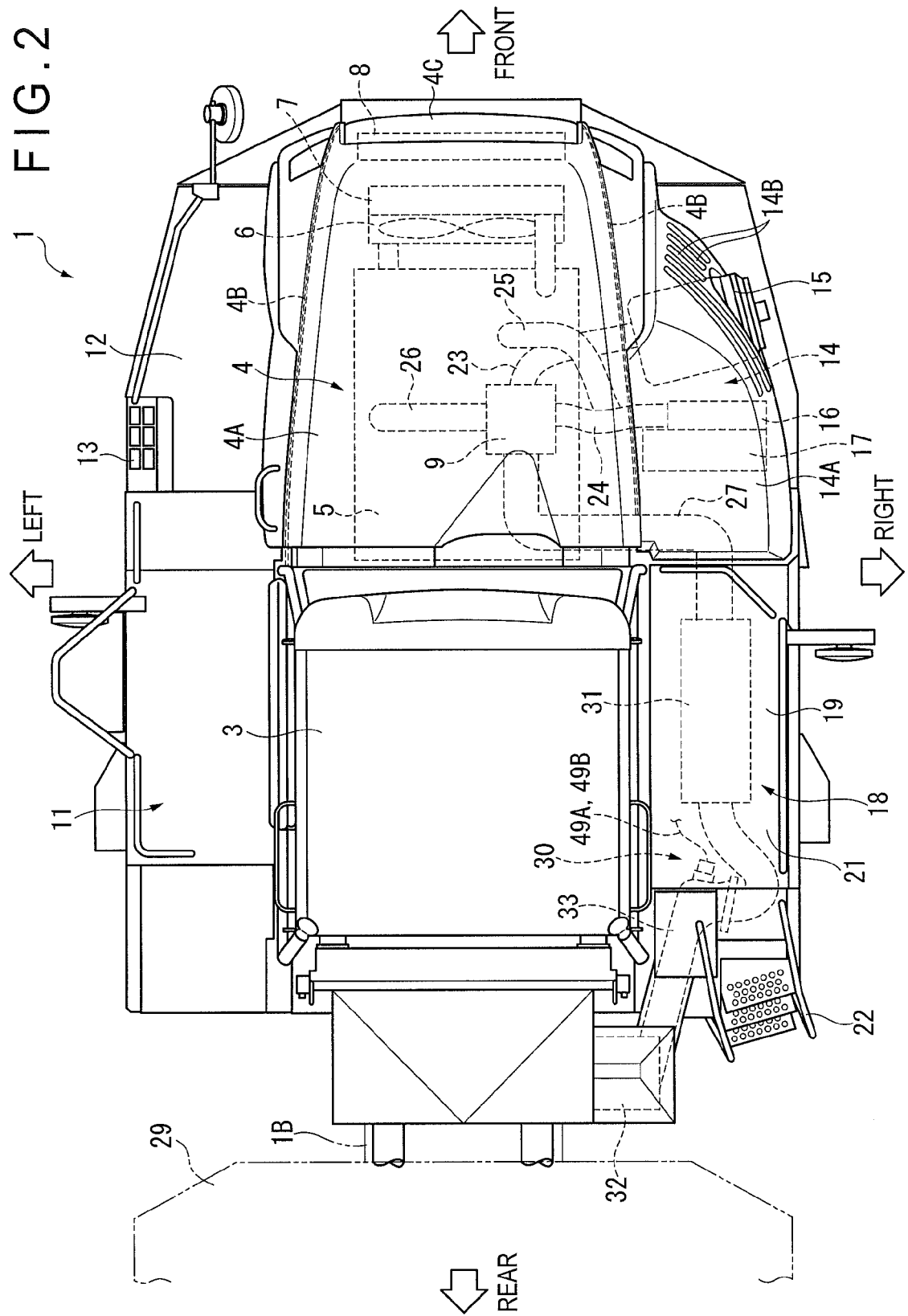
FIG. 2 is a plan view showing a dent of the construction vehicle.

FIGS. 1 and 2 are a side view and a plan view showing a relevant part of a dump truck 1 according to an exemplary embodiment, respectively. As shown in FIGS. 1 and 2, the dump truck 1 is an articulate dump truck including a front frame 1A and a rear frame 1B connected to each other via a connecting portion (not shown).

Description on Whole Structure of Dump Truck

The front frame 1A of the dump truck 1 includes front wheels 2 attached thereto via front axles and front suspensions and a cab 3 mounted thereon via a cab mount for absorbing and damping vibrations. The front frame 1A also includes an engine compartment 4 located in front of the cab 3. While the top of the engine compartment 4 is openably covered with a hood 4A, the right and left sides thereof are covered with partitions 4B.

A diesel engine (hereinafter simply referred to as "engine") 5 is located in the engine compartment 4. In the engine compartment 4, a radiator cooling fan 6 is located in front of the engine 5, a radiator 7 is located in front of the cooling fan 6, and an air-conditioner condenser 8 is located in front of the radiator 7. The engine 5 is equipped with an exhaust turbocharger 9.

A left fender 11, which extends from the left-side front of the engine compartment 4, is located at the left of the cab 3, so that the top of the left fender 11 serves as an access path 12 on which an operator or a repairer can walk. An operator can ascend the access path 12 from the ground using a footboard 13 provided near the front of the left fender 11 and walk rearward to ride in the cab 3. Moreover, when the hood 4A is opened, a repairer can perform maintenance of the inside of the engine compartment 4 while standing on the access path 12. Further, when the cab 2 is rearwardly tilted up as shown in the two-dot chain line in FIG. 1, the repairer can also maintain hydraulic equipment and power transmitter located under the cab 3.

At the right of the engine compartment 4, there is provided a draft chamber 14 covered with a side cover 14A. The draft chamber 14 and the engine compartment 4 are separated with the right partition 4B. In the draft chamber 14, an air cleaner 15, which is partly exposed outside, is located, an aftercooler 16 is located behind the air cleaner 15, and an aftercooler cooling fan 17 is located behind the aftercooler 16.

A right fender 18 is located behind the draft chamber 14, i.e., at the right of the cab 3. A DPF (Diesel Particulate Filter) compartment 19, the top and sides of which are covered, is located on the top of the right fender 18. The top of the DPF compartment 19 serves as an access path 21. The access path 21, under which the DPF compartment 19 is located, is located higher than the access path 12 at the left side. An operator or the like can ascend the access path 21 from the ground using a ladder 22.

Description on Intake of Air and Flow of Exhaust Gas

Next, description will be made on the intake of air to be supplied to the engine 5 and the flow of an exhaust gas from the engine 5.

Air entering the air cleaner 15 is supplied to a compressor of the exhaust turbocharger 9 through an intake pipe 23 and pressurized by the compressor. The pressurized air is then sent to the aftercooler 16 through an intake pipe 24. The air is subjected to heat exchange (i.e., cooled) in the aftercooler 16 and then supplied to the engine 5 through the intake pipe 25 and an intake manifold (not shown).

An exhaust gas from the engine 5 is sent to a turbine of the exhaust turbocharger 9 through an exhaust manifold (not shown) and an exhaust pipe 26. After the turbine is driven, the exhaust gas is sent to an exhaust aftertreatment device 30 (described later) through an exhaust pipe 27. After passing through the exhaust aftertreatment device 30, the exhaust gas is sent to an exhaust gas circuit for body heating provided in a rear body 29 through an exhaust pipe 28 (FIG. 1). After passing through the exhaust gas circuit, the exhaust gas is discharged from an exhaust outlet of the body 29. When the body 29 is tilted to be distanced from an end of the exhaust pipe 28, the exhaust gas is discharged directly from the end of the exhaust pipe 28.

The body 29 is supported on the rear frame 1B in an upwardly tillable manner and is driven by a hoist cylinder including a pair of hydraulic actuators (not shown).

Description on Flow of Cooling Air

Next, description will be made on the flow of a cooling air. When the radiator cooling fan 6 is driven, fresh air (a cooling air) is drawn into the engine compartment 4 through a front grill 4C provided at a front of the hood 4A. Using the cooling air, the air-conditioner condenser 8 is first cooled and the radiator 7 is subsequently cooled. After passing through the radiator 7, the cooling air is directed rearward while cooling the respective surfaces of the engine 5 and the exhaust turbocharger 9 and discharged through a gap between an rear end of the hood 4A and the cab 3 and the like.

Likewise, when the aftercooler cooling fan 17 is driven, fresh air (a cooling air) is drawn into the draft chamber 14 through a plurality of air inlets 14B provided near a front of the side cover 14A. The cooling air is partially used to cool a surface of the air cleaner 15. Subsequently, the cooling air is used to cool the aftercooler 16 and then discharged out below the DPF compartment 19 after passing alongside of the cab 3.

Description on Exhaust Aftertreatment Device

Overall Structure

Description will be made below on the exhaust aftertreatment device 30 according to the exemplary embodiment.

Figure 3:
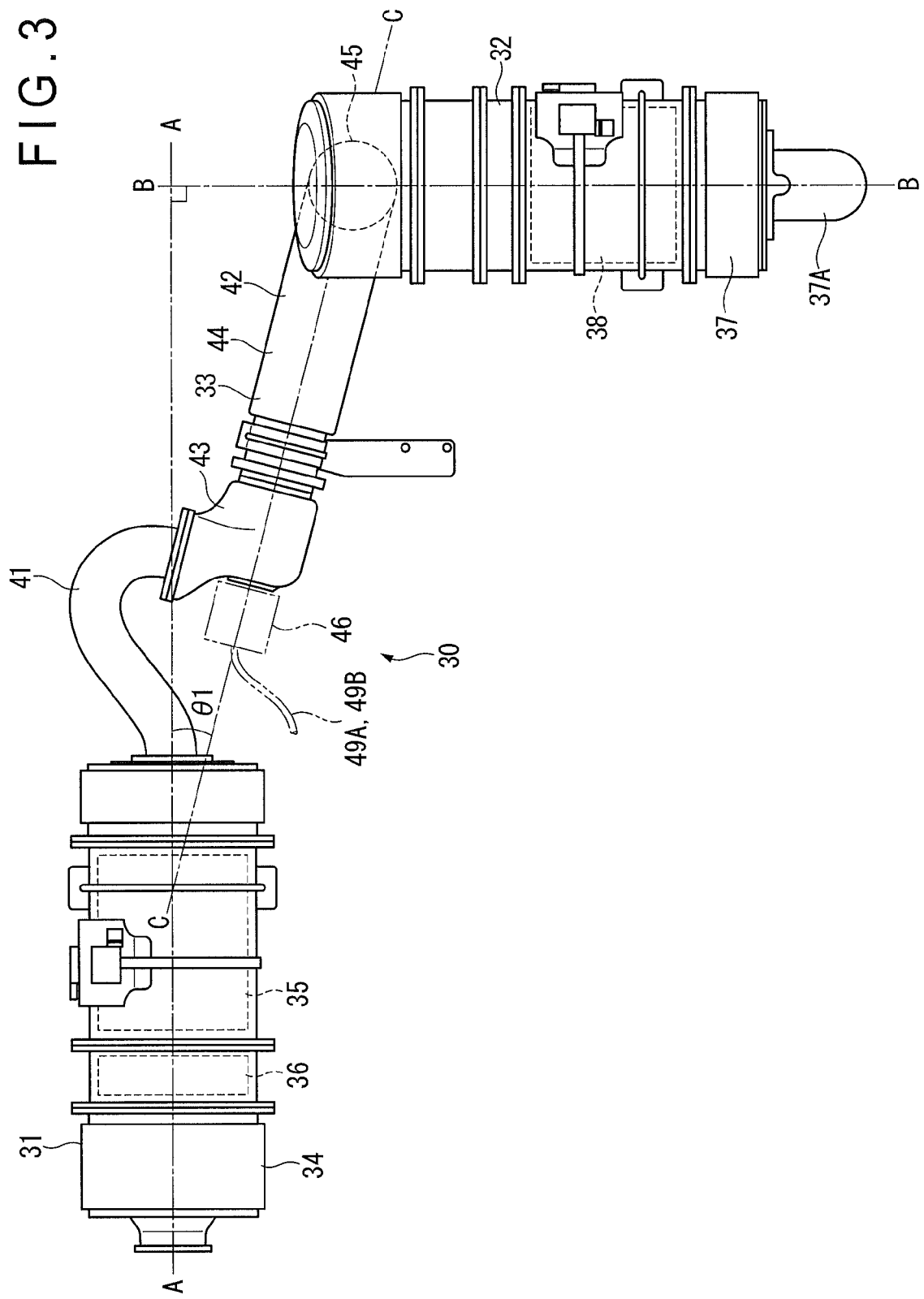
FIG. 3 is a plan view showing an exhaust aftertreatment device equipped in the construction vehicle.

FIG. 3 is a plan view showing the exhaust aftertreatment device 30.

As shown in FIGS. 1 to 3, the exhaust aftertreatment device 30 includes: a DPF device 31 located in the DPF compartment 19 (FIGS. 1 and 2) and connected to a rear end of the exhaust pipe 27; an SCR (Selective Catalytic Reduction) device 32 located downstream of the DPF device 31 and between the cab 3 and the body 29; and a communication pipe 33 through which a downstream end of the DPF device 31 and an upstream end of the SCR device 32 intercommunicate with each other.

The DPF device 31, the SCR device 32 and the communication pipe 33 are located at substantially the same level with a slight difference in height. The DPF device 31 is located in the DPF compartment 19, so that a front end of the exhaust aftertreatment device 30 is located on the top of the right fender 18 near a front thereof.

DPF Device

The DPF device 31 includes a cylindrical casing 34 fixed on a rectangular installation plate 81.

An axis A-A of the DPF device 31 is parallel with a front-rear direction of the vehicle. The exhaust gas flows through the DPF device 31 from the front toward the rear thereof along the front-rear direction of the vehicle. In the casing 34, a DPF 35 adapted to capture PM in the exhaust gas and an oxidation catalyst 36 adapted to activate a dosing fuel are housed. The oxidation catalyst 36 is located upstream of the DPF 35.

The dosing fuel, which may be the same as a fuel for the engine 5, is supplied into the exhaust gas to cause self-burning (burnout) of the PM captured by the DPF 35. The dosing fuel may be supplied into a cylinder of the engine 5 by post-injection or be injected into the exhaust pipe 27.

The dosing fuel supplied into the exhaust gas is activated through the oxidation catalyst 36 to raise the temperature of the exhaust gas to a burning temperature of PM. Such a highly heated exhaust gas causes the self-burning of the PM captured by the DPF 35, so that the clogging of the PM is removed to regenerate the DPF 35.

Incidentally, a front of the installation plate 81 is supported by a support arm 82 attached to the front frame 1A (FIG. 6) and a rear of the installation plate 81 is supported by an appropriate support member (not shown). The DPF 35 and the oxidation catalyst 36 each use known specific structure and the like, the description of which is omitted herein.

SCR Device

The SCR device 32 likewise includes a cylindrical casing 37. An axis B-B of the SCR device 32 located behind the cab 3 is perpendicular to the front-rear direction of the vehicle, i.e., the axis A-A of the DPF device 31, in a plan view. An outlet pipe 37A provided to the casing 37 is bent vertically downward to be connected to the above-described exhaust pipe 28 (FIG. 1). In the casing 37, a selective reduction catalyst 38 adapted to reduce and purify a nitrogen oxide in the exhaust gas is housed. In the exemplary embodiment, a reductant to be supplied to the selective reduction catalyst 38 is ammonia obtained from a urea aqueous solution. The selective reduction catalyst 38 also has known structure and the like, the description of which is omitted herein. Incidentally, in the description of the exemplary embodiment, the ammonia obtained from the urea aqueous solution is referred to as the reductant but, occasionally, the urea aqueous solution is referred to as the reductant. An additional oxidation catalyst for decreasing ammonia may be provided downstream of the selective reduction catalyst 38 to oxidize the excess of the ammonia.

Mixing Pipe

The communication pipe 33 includes a bent pipe 41 forming an upstream portion thereof and a mixing pipe 42 forming a downstream portion thereof. The bent pipe 41, which is in a curved shape with a large diameter, transversely protrudes relative to the vehicle. Thus, the DPF device 31 and the mixing pipe 42 can be connected to each other through the bent pipe 41 without narrowing the area of a flow path of the bent pipe 41. A bellows pipe is provided in the middle of the bent pipe 41 as needed to prevent transmission of vibrations caused in the DPF device 31 to the mixing pipe 42. An axis C-C of the mixing pipe 42 is inclined relative to the front-rear direction of the vehicle, i.e., the axis A-A of the DPF device 31, by an angle θ1 in a plan view. In other words, a downstream end of the mixing pipe 42 is oriented toward the inside of the vehicle.

More specifically, the mixing pipe 42 includes a first elbow 43 into which the exhaust gas flows perpendicularly to the axis C-C in a plan view and through which the direction of the flow of the exhaust gas is changed to be along the axis C-C; a straight pipe 44 that is located downstream of the first elbow 43 and has a predetermined length along the axis C-C; and a second elbow 45 that is located downstream of the straight pipe 44 and is bent vertically upward relative to the axis C-C. Incidentally, all of the axes A-A, B-B and C-C are horizontal axes.

An injector 46 is attached to the first elbow 43 on an extension of the axis C-C. The urea aqueous solution is injected from the injector 46 into the mixing pipe 42. The urea aqueous solution is drawn up from a reductant tank 47, which is located ahead of and below the right fender 18 (FIG. 1), by a supply pump 48 and supplied to the injector 46 through a supply tube 49A. The urea aqueous solution injected from the injector 46 is mixed with the exhaust gas in the straight pipe 44 to be thermally decomposed, thereby obtaining ammonia. The ammonia is supplied as the reductant to the selective reduction catalyst 38 located further downstream through the second elbow 45 to purify the nitrogen oxide in the exhaust gas.

Description on Arrangement of Reductant Tank and Supply Pump

Tank Unit

Figure 4:
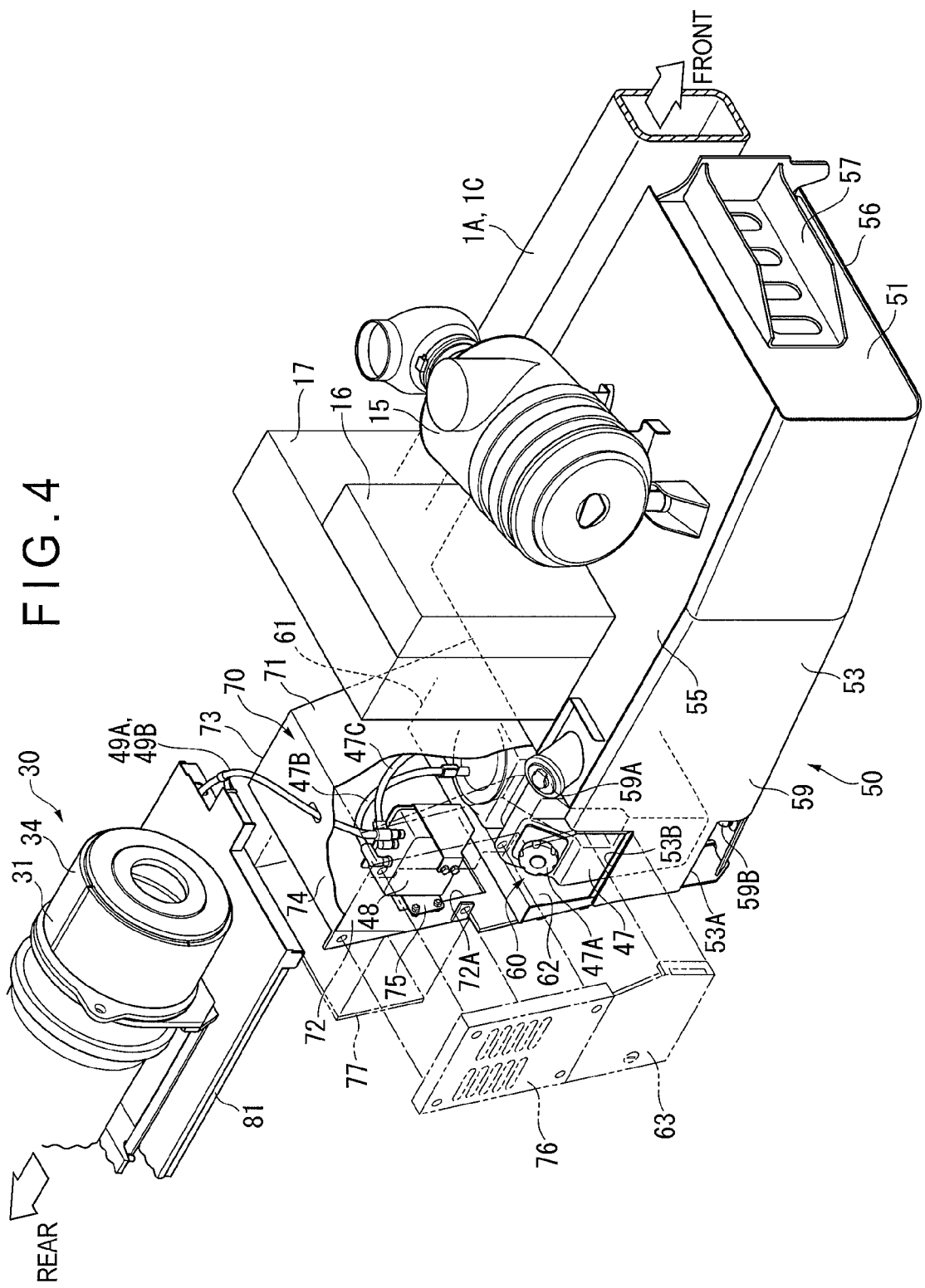
FIG. 4 is a perspective view showing an arrangement of a reductant tank and a supply pump for a reductant.
Figure 5:
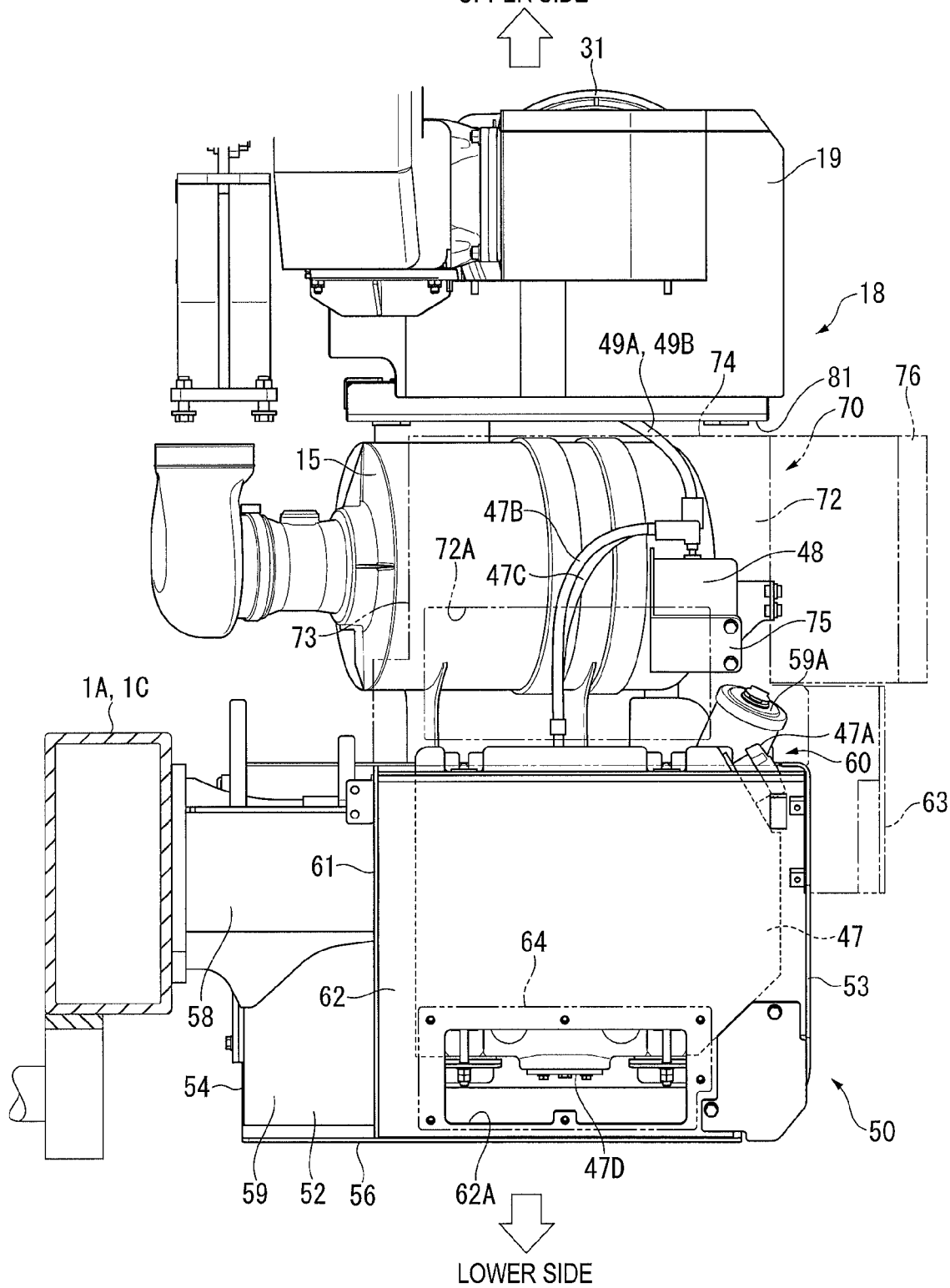
FIG. 5 is a rear view showing the arrangement of the reductant tank and the supply pump as viewed from the rear.
Figure 6:
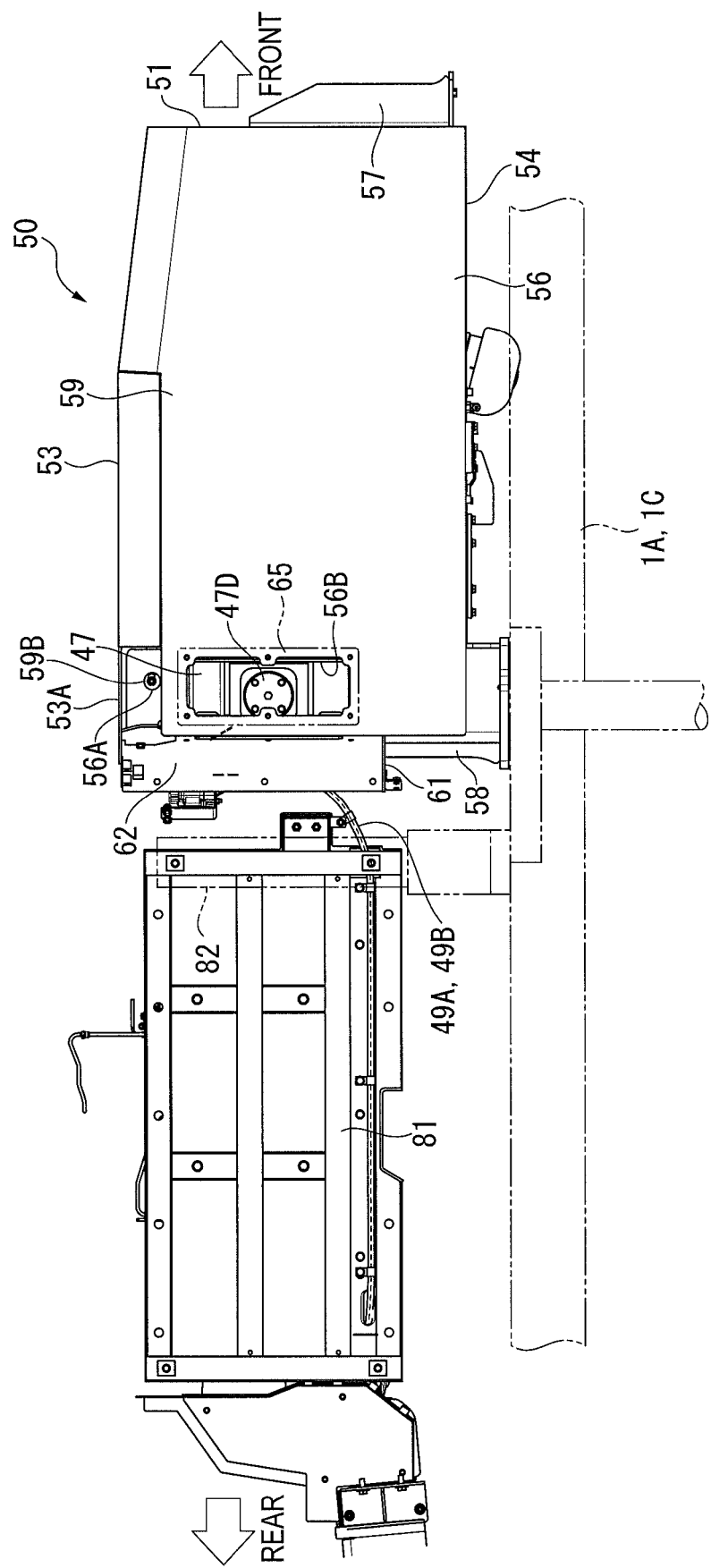
FIG. 6 is a bottom view showing the arrangement of the reductant tank and the supply pump as viewed from beneath.

FIGS. 4 to 6 are a perspective view showing an arrangement of the reductant tank 47 for storing the reductant and the supply pump 48 for supplying the reductant, a rear view showing a particular part of the arrangement including the reductant tank 47 and the supply pump 48 as viewed from the rear, and a bottom view showing the particular part as viewed from beneath, respectively.

As shown in FIGS. 4 to 6, a tank unit 50 in the form of a hollow box is located ahead of and below the right fender 18 (FIG. 1). The tank unit 50 is formed by, for instance, welding a metal plate. In other words, front and rear of the tank unit 50 have a front surface 51 and a rear surface 52, respectively. Outer side and inner side of the tank unit 50 have an outer side surface 53 and an inner side surface 54, respectively. Likewise, top and bottom of the tank unit 50 have an upper surface 55 and a bottom surface 56, respectively.

The front surface 51 of the tank unit 50 is provided with a connecting bracket 57 having a C-shaped cross section and the rear surface 52 is provided with a square-tubular connecting bracket 58. The tank unit 50 is fixed to a side member 1C of the front frame 1A via the connecting brackets 57 and 58.

On the upper surface 55 of the tank unit 50, the air cleaner 15 is mounted, and the aftercooler 16 and the aftercooler cooling fan 17 are also mounted as a unit behind the air cleaner 15. The aftercooler 16 and the aftercooler cooling fan 17 are located ahead of the DPF device 31 and the supply pump 48.

A hollow portion in the tank unit 50, which accounts for a large part thereof, serves as a metallic fuel tank 59. An oil filler hole 59A of the fuel tank 59 is located at an outer rear corner of the upper surface 55. The oil filler hole 59A, which is located at the side of the dump truck 1, is at a height for an operator to be able to easily refuel the dump truck 1 while standing up. The oil filler hole 59A is exposed in an opening 14C provided at a rear lower portion of the side cover 14A (FIG. 1).

Housing

An open-topped housing 60 is located behind the fuel tank 59 and next to an outer side of the connecting bracket 58. A projection portion of the outer side surface 53 of the tank unit 50 forms an outer side of the housing 60. An inner side of the housing 60 has a side surface 61. A rear of the housing 60 has a rear surface 62. A projection portion of the bottom surface 56 of the tank unit 50 forms a bottom of the housing 60.

The outer side surface 53 has an opening 53A located at a position corresponding to the outer side of the housing 60 (FIG. 4). The inside of the opening 53A is in the form of a small hollow space, which is divided from the housing 60. A drain cock 59B of the fuel tank 59 is located in the opening 53A in an externally accessible manner. A fuel flowing out of the drain cock 59B is discharged through an opening 56A of the bottom surface 56 (FIG. 6).

The reductant tank 47, which is made of a synthetic resin, is housed in the housing 60. Since the reductant tank 47 is housed in the housing 60, the reductant tank 47 is located ahead of the right fender 18. With this arrangement, even when wind hits the exhaust aftertreatment device 30 to be heated during traveling, it is possible to prevent the heated wind from being supplied to the reductant tank 47. The reductant tank 47 is fixed on a mount in the housing 60 using an appropriate fixing unit such as a fixing band and an anchor bolt.

In the exemplary embodiment, the reductant tank 47 is provided with a filler hole 47A that is outwardly oriented. The filler hole 47A is located at substantially the same height as that of the oil filler hole 59A of the fuel tank 59. With this arrangement, an operator can easily refill the reductant tank 47 with the urea aqueous solution in a comfortable position in the same manner as when refilling the fuel tank 59.

A plurality of tubes penetrate through a top of the reductant tank 47. The tubes include: a siphon tube 47B through which the urea aqueous solution in the reductant tank 47 is drawn up to the supply pump 48; and a drain tube 47C through which the excess of the urea aqueous solution, which is not injected from the injector 46 (FIG. 3) and returned to the supply pump 48, is returned to the reductant tank 47.

An opening 53B (FIG. 4) of the outer side surface 53 is located on the outer side of the housing 60 above the opening 53A. The filler hole 47A of the reductant tank 47 is exposed in the opening 53B. An openable/closable hatch 63 is attached to the opening 53B. The filler hole 47A is normally covered with the hatch 63, so that the oil filler hole 59A of the fuel tank 59 can be easily discerned from the filler hole 47A. In this manner, it is possible to prevent the reductant tank 47 from being mistakenly filled with a fuel.

As shown in FIG. 5, the rear surface 62 of the housing 60 is provided with an opening 62A, which is located at a position corresponding to a lower portion of the reductant tank 47. When a closure plate 64 used to cover the opening 62A is removed, a repairer can fix/remove the reductant tank 47 onto/from the mount from within a tire housing located below the right fender 18. As shown in FIG. 6, the bottom surface 56 (i.e., the bottom of the housing 60) is likewise provided with an opening 56B, which is located at a position corresponding to the lower portion of the reductant tank 47. When an closure plate 65 used to cover the opening 56B is removed and a drain cover 47D provided on a lower surface of the reductant tank 47 is removed, the urea aqueous solution in the reductant tank 47 can be discharged out.

Shielding Box

As shown by a two-dot chain line in FIG. 4 or 5, the housing 60 is covered with a shielding box 70 located thereabove. Outer side and bottom of the shielding box 70 are opened. The shielding box 70 is likewise formed by, for instance, welding a metal plate. In other words, front and rear of the shielding box 70 have a front surface 71 and a rear surface 72, respectively. An inner side of the shielding box 70 has an inner side surface 73. A top of the shielding box 70 has an upper surface 74.

The shielding box 70 is, for instance, bolted on the tank unit 50. The inside of the shielding box 70 is vertically in communication with the housing 60 located therebelow. The supply pump 48 is attached to the inside of the shielding box 70 with an attachment bracket 75. Since the supply pump 48 is housed in the shielding box 70 (in other words, located ahead of the right fender 18), the supply pump 48 can also be protected from the thermal influence of the wind having hit the exhaust aftertreatment device 30 in the same manner as the reductant tank 47.

The outer side of the shielding box 70 is opened. A lower part of the opening of the outer side is covered with the above-described hatch 63. The other part of the opening is covered with a removable exterior cover 76 having a plurality of louver openings. The supply pump 48 is located at the outermost position (i.e., adjacent to the exterior cover 76), in the shielding box 70, so that when the exterior cover 76 is removed, the supply pump 48 is seen at hand Thus, a repairer can easily replace a filter of the supply pump 48 or the like.

Additionally, since the supply pump 48 is located slightly above the reductant tank 47, the repairer can also perform maintenance of the supply pump 48 from the ground. The rear surface 72 of the shielding box 70 is provided with an opening 72A. When a closure plate 77 used to cover the opening 72A is removed, the repairer can perform maintenance of tubes, electric wiring and the like on the reductant tank 47 from within the tire housing.

The front surface 71 of the shielding box 70 vertically extends between the supply pump 48 and the aftercooler cooling fan 17. Thus, the cooling air from the aftercooler cooling fan 17 located ahead of the supply pump 48 is blocked by the front surface 71, i.e., a shield, so that the supply pump 48 is protected from the cooling air. By protecting the supply pump 48 from the cooling air heated through the aftercooler 16, the supply pimp 48 and the urea aqueous solution can be undisturbedly cooled.

Reductant Tube from Supply Pump

The supply tube 49A, through which the urea aqueous solution is supplied to the injector 46 (FIG. 3), and the return tube 49B, through which the excess of the urea aqueous solution unused by the injector 46 is returned to the supply pump 48, are connected to the supply pump 48.

The tubes 49A and 49B are drawn from the supply pump 48 to penetrate through the upper surface 74 of the shielding box 70. The drawn tubes 49A and 49B are arranged along a lower surface of the installation plate 81, on which the DPF device 31 is mounted, from the front to the rear of the installation plate 81 (FIG. 6) and drawn from the rear of the installation plate 81 to be connected to the injector 46. Since the tubes 49A and 49B are arranged along the lower surface of the installation plate 81, the urea aqueous solution in the tubes 49A and 49B are prevented from being thermally affected by heat from the DPF device 31.

The tubes 49A and 49B, which are connected to the injector 46 located behind the right fender 18 and the supply pump 48 located ahead of the right fender 18, may be shortened as long as the tubes 49A and 49B can be arranged across the right fender 18 from the front to the rear thereof. With this arrangement, a freeze-proofing heater (e.g., a heating wire), which is arranged along the tubes 49A and 49B, may also be shortened, thereby reducing the power consumption of the heater.

Modification(s)

It should be noted that the scope of the invention is not limited to the above exemplary embodiment but may include any modification, improvement or the like as long as it is compatible with the scope of the invention.

Although the exhaust aftertreatment device according to the invention includes the DPF device 31 and the SCR device 32 in the exemplary embodiment, the exhaust aftertreatment device may include only the SCR device. In this case, the SCR device is located on the top of the fender.

Although the ammonia obtained from the urea aqueous solution is used as the reductant to be supplied to the SCR device, the reductant may be appropriately selected depending on the type of the used catalyst.

Although the resin reductant tank 47 is used in the exemplary embodiment, the reductant tank according to the invention may be a metal tank subjected to an anticorrosion treatment against the reductant or the like. Additionally, when the metal reductant tank is used, the reductant tank and the fuel tank may be united as a tank unit.

In the above exemplary embodiment, the exhaust aftertreatment device 30 including the DPF device 31 and the SCR device 32 uses the exemplary arrangement in which the SCR device 32 is located behind the cab 3. However, such an arrangement is not exhaustive. For instance, the SCR device may be located below the cab or on the rear frame without departing from the scope of the invention.

Although the shield according to the invention is exemplified by the front surface 71 of the shielding box 70 in the exemplary embodiment, for instance, a singular plate member, which is not a part of the shielding box, may be used as the shield. In other words, the specific form of the shield may be appropriately determined at the time when the invention is applied.

The invention claimed is:

1. A construction vehicle having a front end and a rear end, the construction vehicle comprising:
    a wheel;
    a fender located vertically above the wheel;
    an exhaust aftertreatment device configured to receive supply of a reductant, wherein at least a portion of the exhaust aftertreatment device, including an upstream end thereof in a flow direction of an exhaust gas, is located on the fender;
    a supply pump adapted to supply the reductant, the supply pump being located forward of the fender and vertically below the exhaust aftertreatment device;
    a reductant tank adapted to store the reductant, the reductant tank being located forward of the fender and vertically below the exhaust aftertreatment device and the supply pump;
    an aftercooler located forward of the exhaust aftertreatment device;
    an aftercooler cooling fan located forward of the exhaust aftertreatment device; and
    a shield adapted to protect the supply pump from a cooling air from the aftercooler cooling fan.

2. A construction vehicle having a front end and a rear end, the construction vehicle comprising:
    a wheel;
    a fender located vertically above the wheel;
    an exhaust aftertreatment device configured to receive supply of a reductant, wherein at least a portion of the exhaust aftertreatment device, including an upstream end thereof in a flow direction of an exhaust gas, is located on the fender;
    a supply pump adapted to supply the reductant, the supply pump being located forward of the fender and vertically below the exhaust aftertreatment device;
    a reductant tank adapted to store the reductant, the reductant tank being located forward of the fender and vertically below the exhaust aftertreatment device and the supply pump; and
    a cab in which an operator rides, the cab being located alongside the fender, wherein the exhaust aftertreatment device comprises:
        a diesel particulate filter device adapted to capture a particulate matter in an exhaust gas from a diesel engine; and
        a selective catalytic reduction device to which the reductant is supplied,
        wherein the diesel particulate filter device is located on the fender, and
        wherein the selective catalytic reduction device is located downstream of the diesel particulate filter device in the flow direction of the exhaust gas and behind the cab.

3. The construction vehicle according to claim 1, further comprising a fuel tank unit having a fuel tank and an integrally formed housing, the fuel tank being located forwardly adjacent to the reductant tank, wherein the reductant tank is made of resin, the fuel tank is made of metal, and the reductant tank is housed in the integrally formed housing of the fuel tank unit.

4. A construction vehicle having a front end and a rear end, the construction vehicle comprising:

a wheel;

a fender located vertically above the wheel;

an exhaust aftertreatment device configured to receive supply of a reductant, wherein at least a portion of the exhaust aftertreatment device, including an upstream end thereof in a flow direction of an exhaust gas, is located on the fender;

an aftercooler located forward of the exhaust aftertreatment device;

an aftercooler cooling fan located forward of the exhaust aftertreatment device;

a supply pump adapted to supply the reductant, the supply pump being located forward of the fender and vertically below the exhaust aftertreatment device; and a reductant tank adapted to store the reductant, the reductant tank being located forward of the fender and vertically below the exhaust aftertreatment device and the supply pump; and a fuel tank unit having a fuel tank and an integrally formed housing, the fuel tank being located forwardly adjacent to the reductant tank, wherein the reductant tank is made of resin, the fuel tank is made of metal, the reductant tank is housed in the integrally formed housing of the fuel tank unit, and the supply pump is located in a shielding box adapted to cover an upper side of the integrally formed housing to block a cooling air from the aftercooler cooling fan.

5. The construction vehicle according to claim 4, further comprising:

an aftercooler located forward of the exhaust aftertreatment device;

an aftercooler cooling fan located forward of the exhaust aftertreatment device; and a shield adapted to protect the supply pump from a cooling air from the aftercooler cooling fan.

6. The construction vehicle according to claim 4, further comprising a cab in which an operator rides, the cab being located alongside the fender, wherein the exhaust aftertreatment device comprises:

a diesel particulate filter device adapted to capture a particulate matter in an exhaust gas from a diesel engine; and a selective catalytic reduction device to which the reductant is supplied, wherein the diesel particulate filter device is located on the fender, and the selective catalytic reduction device is located downstream of the diesel particulate filter device in the flow direction of the exhaust gas and behind the cab.

7. The construction vehicle according to claim 4, wherein the portion of the exhaust aftertreatment device located on the fender is positioned immediately above the fender.

8. The construction vehicle according to claim 1, wherein the portion of the exhaust aftertreatment device located on the fender is positioned immediately above the fender.

9. A construction vehicle having a front end and a rear end, the construction vehicle comprising:

a wheel;

a fender located vertically above the wheel;

a means for treating exhaust, wherein at least a portion of the means for treating exhaust, including an upstream end thereof in a flow direction of an exhaust gas, is located on the fender;

a supply pump adapted to supply reductant to the means for treating exhaust, the supply pump being located forward of the fender and vertically below the means for treating exhaust;

a reductant tank adapted to store the reductant, the reductant tank being located forward of the fender and vertically below the means for treating exhaust and the supply pump;

an aftercooler located forward of the means for treating exhaust;

an aftercooler cooling fan located forward of the means for treating exhaust; and a shield adapted to protect the supply pump from a cooling air from the aftercooler cooling fan.

10. A construction vehicle having a front end and a rear end, the construction vehicle comprising:

a wheel;

a fender located vertically above the wheel;

a means for treating exhaust, wherein at least a portion of the means for treating exhaust, including an upstream end thereof in a flow direction of an exhaust gas, is located on the fender;

a supply pump adapted to supply reductant to the means for treating exhaust, the supply pump being located forward of the fender and vertically below the means for treating exhaust;

a reductant tank adapted to store the reductant, the reductant tank being located forward of the fender and vertically below the means for treating exhaust and the supply pump; and a cab in which an operator rides, the cab being located alongside the fender, wherein the means for treating exhaust includes an exhaust aftertreatment device, the exhaust aftertreatment device comprising:

a diesel particulate filter device adapted to capture a particulate matter in an exhaust gas from a diesel engine; and a selective catalytic reduction device to which the reductant is supplied, wherein the diesel particulate filter device is located on the fender, and wherein the selective catalytic reduction device is located downstream of the diesel particulate filter device in the flow direction of the exhaust gas and behind the cab.

11. The construction vehicle according to claim 9, further comprising a fuel tank unit having a fuel tank and an integrally formed housing, the fuel tank being located forwardly adjacent to the reductant tank, wherein the reductant tank is made of resin, the fuel tank is made of metal, and the reductant tank is housed in the integrally formed housing of the fuel tank unit.

12. The construction vehicle according to claim 2, further comprising a fuel tank unit having a fuel tank and an integrally formed housing, the fuel tank being located forwardly adjacent to the reductant tank, wherein the reductant tank is made of resin, the fuel tank is made of metal, and the reductant tank is housed in the integrally formed housing of the fuel tank unit.

13. The construction vehicle according to claim 2, wherein the portion of the exhaust aftertreatment device located on the fender is positioned immediately above the fender.

14. The construction vehicle according to claim 10, further comprising a fuel tank unit having a fuel tank and an integrally formed housing, the fuel tank being located forwardly adjacent to the reductant tank, wherein
   the reductant tank is made of resin,
   the fuel tank is made of metal, and
   the reductant tank is housed in the integrally formed housing of the fuel tank unit.

* * * * *